March 2, 1971   TAKESHI NAMIKATA ET AL   3,566,520
METHOD OF MANUFACTURING SOLID ELECTROLYTIC CAPACITORS
Filed May 2, 1968                                3 Sheets-Sheet 1
FIG.1 PRIOR ART
FIG.2 PRIOR ART
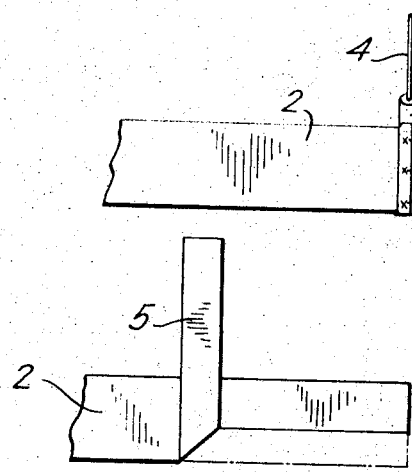
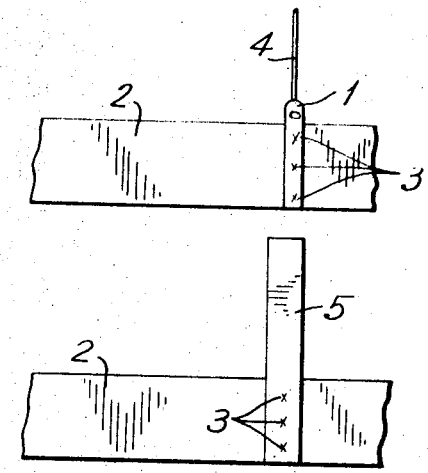
FIG.3 PRIOR ART
FIG.4 PRIOR ART
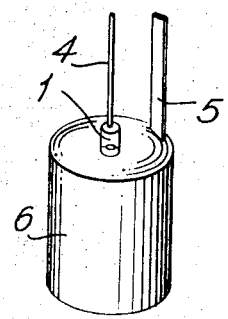
FIG.5 PRIOR ART
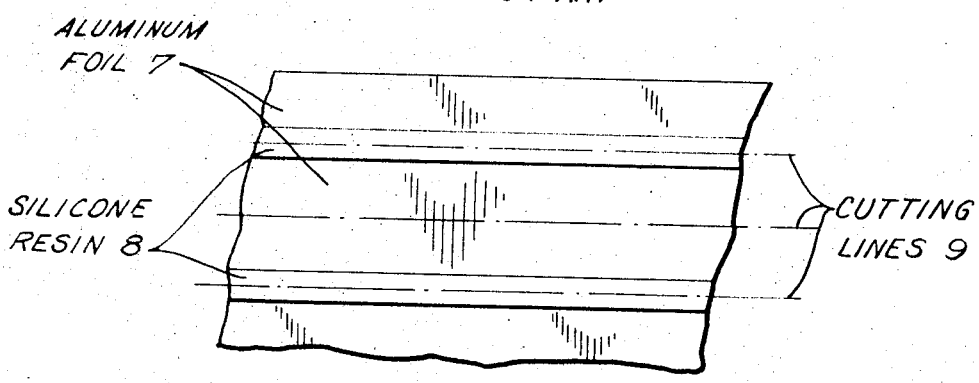
FIG.6

- ANODE LEAD WIRE 25
- ZINC CONTACT LAYER 24
- SILICONE RESIN 8
- SILICONE RESIN 23
- ANODE FOIL 7
- OXIDE FILM 20
- MANGANESE DIOXIDE LAYER 21
- CATHODE FOIL 22
- ZINC CONTACT LAYER 24
- CATHODE LEAD WIRE 26

United States Patent Office 3,566,520
Patented Mar. 2, 1971

3,566,520
METHOD OF MANUFACTURING SOLID ELECTROLYTIC CAPACITORS
Takeshi Namikata and Katsutoshi Yamaguchi, Kawasaki-shi, Japan, assignors to Fujitsu Limited, Kawasaki, Japan
Filed May 2, 1968, Ser. No. 726,123
Int. Cl. B01j *17/00;* H01g *9/00*
U.S. Cl. 29—570                                7 Claims

ABSTRACT OF THE DISCLOSURE

A solid electrolytic capacitor is manufactured by coating a longitudinally extending area at one edge of an aluminum anode foil on both surfaces thereof with heat-resistant electrically insulating material of silicone resin. Both surfaces of an aluminum cathode foil are coated with a lacquer of cellulose derivative. The anode foil and the cathode foil are overlapped with part of the coated area of the anode foil extending beyond the edge of the cathode foil and the foils of the body are wound. The wound body is reformed and the lacquer is decomposed and removed from the cathode foil. The end faces of the wound body are covered with heat-resistant insulation of silicone resin. Lead wires are affixed to the end faces of the wound body by removing the insulation covering such faces, applying zinc to such faces and soldering the lead wires to the zinc.

DESCRIPTION OF THE INVENTION

Our invention relates to a method of manufacturing solid electrolytic capacitors. More particularly, our invention relates to the manufacture of solid electrolytic capacitors, particularly wound-foil type solid electrolytic capacitors whose terminal leads extend from the end faces of the capacitor body.

Solid capacitors whose dielectric is an oxide film obtained by anodically oxidizing a film-forming metal, such as aluminum or tantalum, and whose cathode consists of a manganese dioxide layer precipitated on the oxide film by pyrolysis of manganeses nitrate, are known to have excellent electrical characteristics. As a rule, a filamentary or plate-shaped element or a sintered body is used as the anode member of such a capacitor. It has been rather difficult, however, to manufacture a sintered anode member of aluminum and to secure the desired optimal electrical characteristics. Aluminum solid capacitors of large capacitance, therefore, have been provided with a separator tape between anode foil and cathode foil. The separator tape, wound together with the foils to form a capacitor body, has been made of glass cloth and it has also been proposed to use for this purpose a thin film of varnish whose chief constituent is a cellulose derivative.

In all of the known methods, wires extending from the wound capacitor body are contacted with the anode foil and the cathode foil, respectively, before or during the winding operation. This is done primarily because once the wires are thus contacted, affixed, joined or fastened, they facilitate holding the capacitor during the further process of its manufacture and can also be used as electrical conductors in the reformation treatment.

Known methods of leading the terminal leads or wires from the capacitor body to be wound are described with reference to FIGS. 1 to 5. FIGS. 1 and 2 show known methods of extending a terminal lead, wire, or the like, away from an electrode foil of a capacitor. In FIGS. 1 and 2, an aluminum rod 1 is affixed to an electrode foil 2. The rod 1 extends transversely across the foil 2 and has small holes aligned along its length (not shown in the figures). The electrode foil 2 may be inserted into the holes in the rod 1 by providing said foil with bosses or the like protuberances, for example, which protuberances enter into corresponding ones of said holes.

The aluminum rod 1 may be provided with a flat face and the electrode foil 2 may be positioned in abutment with said flat face. The rod 1 and the foil 2 may then be welded, soldered, cemented, or otherwise joined to each other such as, for example, at localities or points 3. A wire 4 of copper, or any other suitable solderable electrically conductive material is connected or affixed to the end face of the aluminum rod 1 in a manner whereby said wire extends from said rod in alignment therewith. The wire 4 is preferably fused or welded to the rod 1.

FIGS. 3 and 4 show a method of extending a conductor foil strip 5 from the electrode foil 2. In FIG. 3, the foil strip 5, which constitutes the terminal lead, terminal conductor, terminal wire, or lead wire, is cut out of the electrode foil 2, itself, and is folded over so that it extends at a right angle to the longitudinal direction of said electrode foil. In FIG. 4, a separate foil strip 5 is joined or affixed to the electrode foil 2 by any suitable means such as, for example, welding, fusing or cementing, at the localities 3. The leads 4 and 5 extend from the wound body 6.

In FIG. 5, one lead wire 4 is affixed to the anode foil in accordance with the method illustrated in FIGS. 1 or 2 and the other lead wire is joined to the cathode foil by the method illustrated in FIGS. 3 or 4.

After the lead wires or terminal conductors are joined to the wound body 6, as hereinbefore described, a solution of manganese nitrate in water is pyrolyzed. For this purpose, the wound body and the foils constituting said body are impregnated with, or immersed in, manganese nitrate solution, which is then heated to the dissociation temperature between 350° and 450° C. As a result, manganese dioxide is precipitated. After the production of a manganese dioxide layer, the wound body is subjected to a reformation treatment for removing any fissures or cracks which may have formed during the precipitation of the dioxide. The details of the reformation process are disclosed in copending patent application Ser. No. 548,008, filed May 5, 1966, and assigned to the assignee of the present invention.

Ordinarily, the pyrolysis treatment is repeated at least three times and the reformation treatment is also repeated each time. The mechanical adhesion of the lead wires, which is not very high initially, is thus lowered during the initial stages of the manufacturing process, due to the softening caused by the heat treatment. Furthermore, as the pyrolysis is repeated, the deposition of manganese dioxide upon the lead wires causes said lead wires to become stiff, so that the bond between the lead wire and the electrode foil is especially liable to break. When one lead wire is bent and extends outwardly in two directions, the bond breakage problem is particularly aggravated.

Among various methods attempted in order to strengthen the bond or connection of the lead wire and the electrode foil, a thick aluminum plate is utilized. The use of a thick aluminum plate, however, creates several other disadvantages and deficiencies. The aluminum plate deforms the wound body, enlarges the size of the capacitor and is a cause of short-circuits.

On the other hand, since the reformation treatment requires the use of lead wires to which conductors of copper or annealed steel are welded, a protective coating must be provided, in order to prevent a short-circuit between the formation liquid and the copper or steel conductors. However, the manganese dioxide deposited upon the lead wires makes it difficult to fuse said lead wires to the copper or steel conductors.

It is thus seen that in manufacturing wound foil type solid capacitors, and particularly in manufacturing such capacitors having large capacitances, there are several difficulties which are adverse to maintaining the lead wires affixed to the electrode foils.

The principal object of the present invention is to provide a new and improved method of manufacturing solid electrolytic capacitors.

An object of the present invention is to provide a method of manufacture of wound foil type solid electrolytic capacitors which overcomes and avoids the disadvantages and deficiencies of the known methods.

An object of the present invention is to provide a method of manufacture of solid electrolytic capacitors without utilizing electrode foils to which lead wires are affixed prior to or during the winding operation, and to provide reliable joinder of the lead wires to the electrode foil after completion of the winding operation.

An object of the present invention is to provide a method of manufacturing solid electrolytic capacitors wherein the wound capacitor body without lead wires is satisfactorily reformed.

Another object of the present invention is to provide a method of manufacturing solid electrolytic capacitors which reliably prevents the cathode and the anode from being short-circuited as a consequence of the reformation treatment or the precipitation of manganese dioxide by pyrolysis of manganese nitrate.

The disadvantages and deficiencies of the aforedescribed known methods arise from the provision of lead wires for the wound body. Such disadvantages and deficiencies may thus be eliminated if the wound body without lead wires may be reformed and manganese nitrate be pyrolyzed thereon, and the lead wires are then firmly affixed to the wound body after completion of the reformation and pyrolysis processes. Since the reformation or repairing formation must be performed after the winding of the body, it must be possible to take lead wires out from the wound body. In the known solid electrolytic capacitor manufacturing process, the entire surface of the anode foil is oxidized and said anode foil is wound together with the cathode foil and the separator. It is therefore impossible to take a lead wire out from only the anode.

In accordance with the present invention, first, an anode foil consisting of an anodically oxidized film-forming metal is used as the anode and a metal cathode foil coated with an insulating layer of a cellulose derivative which can be resolved at a temperature equal to the temperature at which a solution of manganese nitrate in water can be pyrolyzed, for example, is used as the cathode. The insulating layer is the equivalent of a separator such as glass cloth.

The anode foil and the cathode foil are wound while they are shifted from each other in position. The foils are shifted in position in such a manner that only a part of the anode foil projects from one end of the wound body and only a part of the cathode foil projects from the other end. The metal of the element is exposed at the end faces of the wound body, so that outside conductors may make electrical connection with said end faces. The arrangement permits lead wires to be taken out from the anode and cathode independently from each other.

In the winding process, it is necessary to prevent a short-circuit of the corner or edge part of the cathode foil and the anode foil. In accordance with our invention, band-shaped insulating layers are formed on the two surfaces of the part of the anode foil with which the corner part of the cathode foil is in contact. It is difficult to coat a thin cathode foil with an insulating layer of cellulose derivative so uniformly that even the edge part is covered. The insulating layer of cellulose derivative generally cannot be formed on the edge part of the cathode foil. Therefore, in the winding of the body, the edge part of the cathode foil may cut into the formed film on the anode foil and come into contact with the anode foil metal.

The aforedescribed problem is solved, in accordance with our invention, by forming the band-shaped insulating layers on the anode foil. The band-shaped insulating layers comprise material which is an excellent electrical insulator which is thermally stable. A suitable material for the insulating layer may comprise, for example, a silicone resin or heat resisting enamel.

After the body is wound, as in the conventional method, a repairing formation process must be performed to repair damage such as cracks and abrasions caused by the winding of the formed film on the anode foil. In accordance with the present invention, lead wires may be taken out independently from the anode and the cathode and the insulating layers may be formed on the anode foil without difficulty, without affixing lead wires to the electrode foil in advance. The insulating layers cannot be formed on the anode foil if the lead wires come into contact with the forming liquid, however, so that it is desirable to utilize a film-forming metal capable of forming an insulating film or layer even if it contacts the forming liquid. The insulating film, however, is also formed on the end part of the lead wire in contact with the anode foil, so that the lead wire is therefore insulated from the anode. If the reformation cannot be effected, neither can the method of the present invention for manufacturing capacitors.

In accordance with the present invention, secondly, an anode comprising a film-forming metal having sharp teeth, projections, points, or the like, at its end is utilized in the reformation process. The utilization of such an anode permits reformation without providing insulation after the impression of the forming voltage. After the reformation or repairing formation of the wound body is completed, a solution of manganese nitrate in water, for example, is pyrolyzed and a semiconductive layer of manganese dioxide is formed on said wound body.

During the pyrolysis treatment, the insulating layer of cellulose derivative formed on the cathode foil is decomposed and vanished. Alternatively, the forming of manganese dioxide on the cathode foil may also be provided by decomposing and vanishing the cellulose derivative by an additional heating process preceding the pyrolysis treatment. The cellulose derivative must comprise a material which is such that scarcely any useless remnant remains after the decomposition thereof. A suitable cellulose derivative material may comprise, for example, nitrocellulose, ethyl cellulose or methyl cellulose.

In accordance with our invention, thirdly, the pyrolysis treatment is preceded by the painting of a heat-resisting insulating paint such as, for example, a silicone resin paint, on the end face of the wound body from which the anode foil protrudes. The point is then dried to form an insulating layer. This prevents short-circuiting by manganese dioxide precipitated by pyrolysis of manganese nitrate solution between the exposed base metal part of the anode utilized in the reformation process and the cathode. After the pyrolysis treatment, the insulating layer of silicone resin, or the like, formed on the end face of the wound body is removed by polishing and the base metal surface of the anode is exposed again. The reformation and pyrolysis processes are then repeated the necessary number of times, in accordance with the second and third aforedescribed features of our invention.

In accordance with the present invention, fourthly, conductive layers are provided on the end faces of the wound body and lead wires are affixed to said conductive layers. The conductive layers may be provided by metal spraying or painting with electrically conductive material or paint. Various methods may be utilized to affix a lead wire to a relatively wide end face of a wound body. The lead wire may, for example, be soldered to the conductive layer, so that the bond or adhesive strength between the wire and the layer is considerably greater than the bond or adhesive strength between a lead wire and an electrode foil to which the lead wire is affixed by the known method.

Either only the two sides of the anode foil are anodically oxidized or the entire surface of the anode foil is oxidized, so that the outside electrical conductor may be affixed during the reformation process. Even if the end face of the wound body is covered by the formed film, the lead wire and the anode may be electrically connected or affixed to each other at the forming voltage by utilizing the lead wire provided in accordance with the second feature of the present invention. It is therefore not absolutely necessary that the base anode metal be exposed at one end face of the wound body. Our invention thus permits the manufacture of wound-foil type solid electrolytic capacitors by utilizing a wound body having no lead wires and by providing pyrolysis and reformation processes or treatment.

In accordance with the present invention, the electrode need not be provided with lead wires or an independent separator such as glass cloth. Consequently, unnecessary inside winding and unnecessary outside winding of the wound body may be reduced. That is, the size of the wound body may be reduced and the possibility of short-circuit caused by the edge of the lead wire may be eliminated. The method of our invention eliminates the disadvantage or defect of the known method which is the making brittle of a thin lead wire by the provision of manganese dioxide. The method of the present invention also eliminates various defects of the known method caused by the affixing of the lead wires to the electrode foil in advance, and greatly improves the efficiency of the winding process and the yield of the products.

In order that the present invention may be readily carried into effect, it will now be described with reference to the accompanying drawings, wherein:

FIGS. 1 and 2 are schematic diagrams illustrating known methods of extending a wire from an electrode foil of a capacitor;

FIGS. 3 and 4 are schematic diagrams illustrating known methods of extending a foil strip from an electrode foil of a capacitor;

FIG. 5 is a perspective view of a capacitor produced by the methods illustrated in FIGS. 1 to 4;

FIG. 6 is a schematic diagram of an electrode foil having heat-resistant insulating coatings painted thereon in accordance with the method of the present invention;

FIG. 6 illustrates the method of the present invention for fabricating an anode foil. In FIG. 6, an anodically oxidized aluminum foil 7 has a wide width. The aluminum foil 7 may be formed by anodically oxidizing high-purity aluminum of a thickness of $65\mu$ in a known or ordinary forming liquid. Silicone resin 8 is then painted at the same positions on the two surfaces of the aluminum foil 7 at a width of 2 to 10 mm.

The aluminum foil 7 is then cut along the broken lines 9. The aluminum anode foils are thus fabricated with band-shaped insulating layers. The base aluminum is exposed at the end face or edge of the aluminum anode foil.

The cathode may be fabricated by the method disclosed in the aforementioned copending patent application Ser. No. 548,008. High-purity aluminum foil of the same width as the anode foil, for example, is passed through a lacquer formed by dissolving a cellulose derivative in an organic solvent such as ether, acetone or methanol. Lacquer layers of a thickness of 15 to $20\mu$, for example, are consequently formed on the two surfaces of the cathode foil.

Since the cathode foil utilized is as thin as $50\mu$, it is not easy to adhere the lacquer to the edge of the cathode foil. The base aluminum of the cathode foil is thus exposed along its edge. Nitrocellulose, ethyl cellulose and acetylcellulose may be utilized as the cellulose derivative. The thickness of the lacquer layer may be varied by varying the viscosity of the lacquer. In the foregoing example, the viscosity of the lacquer is about 100 centipose. The addition of a fine powder of manganese dioxide to the lacquer is advantageous in facilitating the precipitation of manganese dioxide in the pyrolysis treatment.

Figure 7:
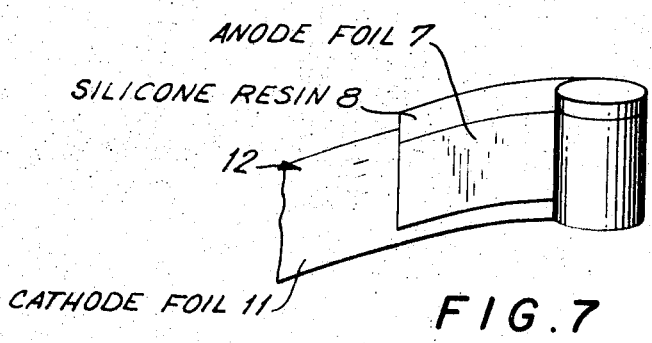
FIG. 7 is a schematic diagram illustrating the winding of a capacitor body in accordance with the method of the present invention.

The anode and the cathode are wound as shown in FIG. 7. The anode foil, which comprises the aluminum foil 7 having the silicone resin strips 8 thereon, is positioned higher than the cathode foil 11. The cathode foil 11 is positioned lower than the foil 28. The anode foil and the cathode foil are wound so that the edge 12 of the cathode foil 11 is adjacent the band-shaped insulating layer 8 of silicone resin.

After the completion of the winding process, the wound body is heated to decompose and vanish the lacquer film covering the cathode foil. The wound body may be heated either after the completion of the winding process, independently from the pyrolysis treatment of manganese nitrate, or simutaneously with the pyrolysis treatment of manganese nitrate. Thus, the wound body may be produced without an independent separator such as glass cloth, and the lacquer layer of cellulose derivative may be removed after the body is wound. The electrical characteristic of the capacitor may therefore be greately improved.

Figure 8:
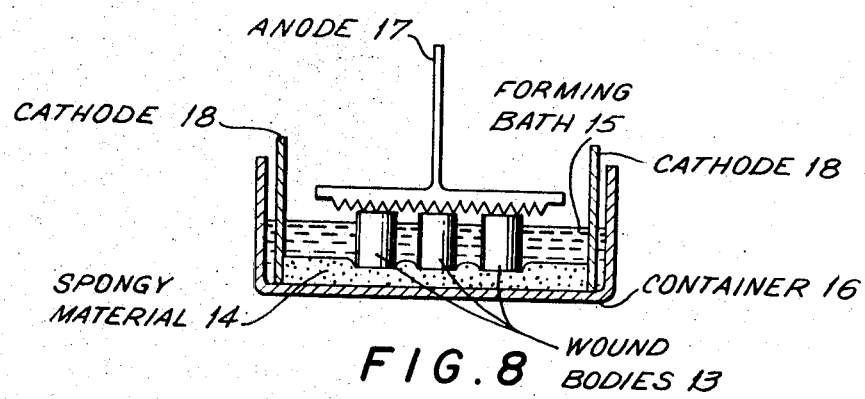
FIG. 8 is a schematic diagram, partly in section, illustrating the reforming of the capacitor body made by the method illustrated in FIG. 7 in accordance with the present invention.

After the completion of the heat treatment is finished, it is desirable to undertake reformation or repairing formation in order to repair the formed film. The reformation process may be undertaken with the apparatus shown in FIG. 8. In FIG. 8, a plurality of wound bodies 13 are placed on a spongy material 14 in a forming bath 15. The spongy material 14 and the forming bath 15 are provided in a container 16. An anode or electrode 17 for providing electrical current has a plurality of sharp projections, points, teeth, or the like, which are pressed on the end faces of the wound bodies 13 at which the anode foils extend beyond the cathode foils (FIG. 7).

The spongy material 14 may comprise, for example, glass wool. The electrode 17 for providing current preferably comprises a film-forming metal such as tantalum. The tantalum electrode prevents a short-circuit with the forming bath or liquid 15 and prevents insulation by the formed oxide film, so that forming current flows without difficulty until the completion of the forming process. A forming cathode 18 is provided in the bath 15.

Figure 9:
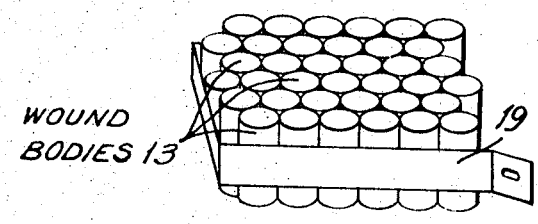
FIG. 9 is a perspective schematic diagram illustrating the holding of a number of capacitors in accordance with the method of the present invention.

A plurality of wound bodies 13 may be held together for facility. The wound bodies 13 may be held together, as shown in FIG. 9, by a band, belt, strap, strip, or the like, 19. The band 19 comprises a corrosion-resisting metal such as aluminum or tantalum.

Upon the completion of the reformation process, a semiconductive layer of manganese dioxide is precipitated between the anode foil and the cathode foil. At such time, in accordance with the method of the present invention, the two end faces of the wound body are coated with heat-resistant insulation such as, for example, silicone resin. This prevents the occurrence of a short-circuit between the base aluminum of the anode and the cathode. Upon completion of the pyrolysis treatment of the manganese nitrate, the insulating layer at each end face is polished and removed, so that the base anode metal is exposed again. Thermal deterioration of the formed film due to the pyrolysis treatment may be corrected by reforming said film. This may be accomplished by providing a current flow through the base anode metal, as in the reforming process. Then, similar pyrolysis and reformation processes are repeated.

Upon completion of the final forming process, the capacitor is impregnated in wax in order to improve its resistance to dampness. Lead wires are attached to the end faces of the wound bodies by first removing wax and oxide films from said end faces. This may be accomplished by spraying fine sand on the end faces of the wound bodies. The sand blasting produces unevenness in the end faces of the wound bodies, so that the adhesiveness of metal or electrically conductive paint or material sprayed or painted on said faces is improved. In an embodiment of our invention, zinc is sprayed on the end faces and lead wires are soldered thereon.

Figure 10:
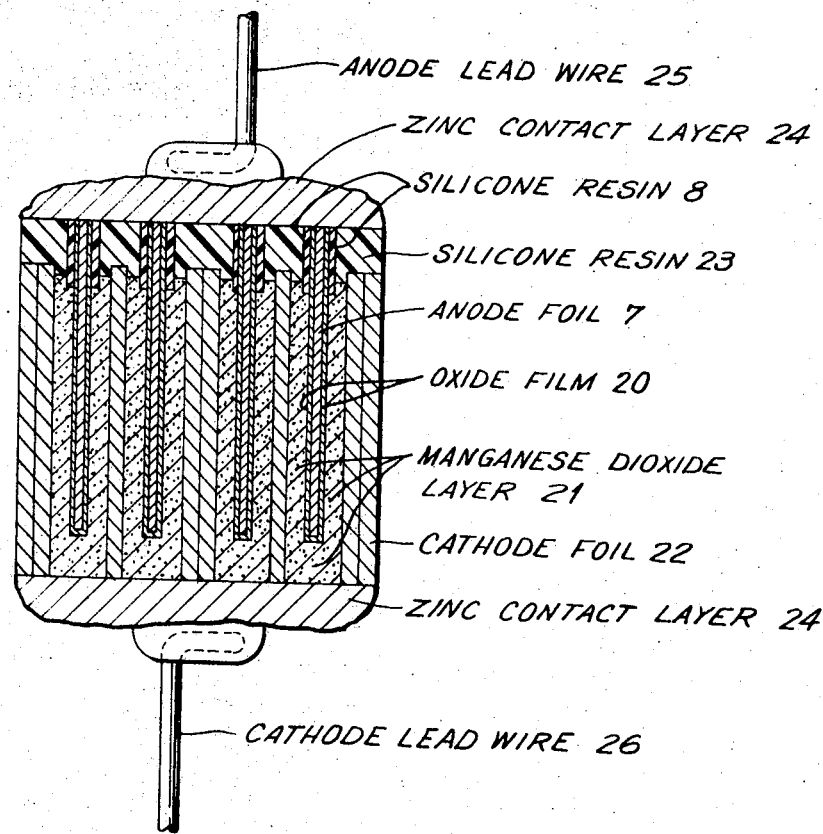
FIG. 10 is a sectional view of a capacitor made by the method of the present invention.
Figure 11:
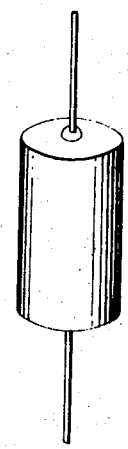
FIG. 11 is a perspective view of a capacitor made by the method of the present invention.

A capacitor manufactured in accordance with the method of the present invention, is shown in FIGS. 10 and 11. In FIG. 10, the anode foil 7 has a film 20 of oxide on its surfaces. The strips of silicone resin 8 are coated on the anode foil 7 (FIGS. 6 and 7). A manganese dioxide layer 21 is precipitated by pyrolysis of manganese nitrate. The cathode foil 22 is provided.

In FIG. 10, an insulating layer 23 of silicone resin is provided on the end face of the wound body prior to the pyrolysis process. A zinc contact layer 24 is sprayed onto each end face of the wound body. An anode lead wire 25 is soldered to the zinc layer 24 at the top of the capacitor and a cathode lead wire 26 is soldered to the zinc layer 24 at the bottom of said capacitor.

While the invention has been described by means of a specific example and in a specific embodiment, we do not wish to be limited thereto, for obvious modifications will occur to those skilled in the art without departing from the spirit and scope of the invention.

We claim:
1. A method of manufacture of solid electrolytic capacitors, comprising the steps of
coating a longitudinally extending area at one edge of an anode foil on both surfaces thereof with heat-resistant electrically insulating material;
covering both surfaces of a cathode foil with a lacquer of cellulose derivative;
overlapping the anode foil and the cathode foil with part of the coated area of the anode foil extending beyond the edge of the cathode foil;
winding tht anode foil with the cathode foil;
decomposing and vanishing the lacquer from the cathode foil;
covering the anode end face of the wound body with heat-resistant insulation;
impregnating the wound body with manganese nitrate through the cathode end face of the wound body;
pyrolyzing the manganese nitrate;
removing the heat-resistant insulation from portions of the end faces until the anode face is exposed;
reforming the wound body; and
affixing lead wires to the portions of end faces of the wound body.

2. A method as claimed in claim 1, wherein said heat-resistant electrically insulating material is silicone resin.

3. A method as claimed in claim 1, wherein each of said anode and cathode foil comprises aluminum.

4. A method as claimed in claim 1, wherein the end faces of the wound body are covered with silicone resin.

5. A method as claimed in claim 1, wherein reforming is accomplished with a reforming anode having a plurality of sharp teeth in contact with the coated area end face of the anode foil.

6. A method as claimed in claim 1, further comprising the steps of impregnating the end faces of the wound body with wax, removing the wax from said end faces, applying metal to said end faces and affixing lead wires to the applied metal.

7. A method as claimed in claim 6, wherein zinc is applied to the end faces and the lead wires are soldered to the zinc.

References Cited
UNITED STATES PATENTS

| | | | |
|---|---|---|---|
| 2,055,216 | 9/1936 | Edelman | 29—570X |
| 2,177,086 | 10/1939 | Williams | 29—570 |
| 2,297,608 | 9/1942 | Blackburn | 29—570X |
| 2,727,297 | 12/1955 | Fralish et al. | 29—25.42 |
| 3,254,390 | 6/1966 | Shtasel | 317—230 |
| 3,270,254 | 8/1966 | Cohn | 317—231X |
| 3,274,663 | 9/1966 | Bonenfant | 29—25.42 |
| 3,302,075 | 1/1967 | Cerych et al. | 29—570X |
| 3,303,550 | 2/1967 | Banzhoff, Jr. | 29—25.42 |
| 3,346,781 | 10/1967 | Moresi, Jr. et al. | 29—570X |
| 3,454,999 | 7/1969 | Koyanagi et al. | 29—25.42 |
| 3,458,775 | 7/1969 | Flaks et al. | 29—570 |
| 3,469,294 | 9/1969 | Hayashi et al. | 29—25.42 |
| 3,371,295 | 2/1968 | Bourgault et al. | 317—260 |

JOHN F. CAMPBELL, Primary Examiner

R. B. LAZARUS, Assistant Examiner

U.S. Cl. X.R.
29—25.42; 317—230